June 16, 1953  E. S. CLEMENS  2,641,992
MEANS FOR BREWING BEVERAGES AND THE LIKE
Filed June 25, 1949  2 Sheets-Sheet 1

Fig. 1.

INVENTOR.
EDWIN S. CLEMENS
BY
Kenyon & Kenyon
ATTORNEYS

June 16, 1953 E. S. CLEMENS 2,641,992
MEANS FOR BREWING BEVERAGES AND THE LIKE
Filed June 25, 1949 2 Sheets-Sheet 2

Fig. 2.

INVENTOR.
EDWIN S. CLEMENS
BY Kenyon & Kenyon
ATTORNEYS

Patented June 16, 1953

2,641,992

UNITED STATES PATENT OFFICE 2,641,992

MEANS FOR BREWING BEVERAGES AND THE LIKE

Edwin S. Clemens, New Orleans, La.

Application June 25, 1949, Serial No. 101,328

13 Claims. (Cl. 99—282)

While the invention disclosed herein is particularly useful for the preparation of beverages such as coffee or tea, it nevertheless comprises essentially a new and improved method and means for brewing any kind of liquid requiring the infusion of hot water or like liquid in a mash of material from which the ingredients are to be extracted, such as coffee grounds or tea leaves. It has for its principal object the provision of a method and means which will insure the production of a consistently uniform brew of optimum quality or composition by the elimination of numerous variable factors tending in conventional practice to impair quality, for example, by the elimination of variations in infusion time, brewing temperatures, and the like, whether attributable to lack of skill on the part of operating personnel or to mechanical shortcomings of apparatus. To that end the invention contemplates further and specifically automatic or semi-automatic means insuring uniform and automatic repetition of a brewing cycle at the will of the operator but without the necessity of attentive operator control.

The features of the invention upon which patent protection is sought are set forth in the appended claims. The invention itself together with further objects and the advantages thereof will best be understood by reference to the following exposition when taken in conjunction with the accompanying drawings illustrating embodiments of the invention particularly adapted for use in the preparation of coffee or tea in restaurant or hotel installations and operable either by gas (Fig. 1) or electricity (Fig. 2).

General requirements

With prior art methods and apparatus in common use in restaurants or hotels, for example, it has been somewhat difficult to produce repeated batches of beverages such as hot coffee, tea or the like of a consistent and uniform quality because a somewhat critical maintenance of conditions necessary to proper brewing becomes much a matter of chance depending upon many factors of personnel or machinery nature. Taking coffee as an illustration, the net result is that in restaurant and hotel practice, for example, a high quality cup of coffee may be served at one time of the day and a poor one at another, all depending upon the chance that the proper conditions of brew preparation have obtained. The reasons for this will be better appreciated if one considers some of the more important factors entering into the proper preparation of the coffee brew, as follows:

First of all, to make good coffee, fresh briskly boiling water is essential. This water should be applied to the grounds slowly, at maximum temperature, preferably while it is still boiling, and in the amount and at the rate that will allow the water to remain in contact with the coffee grounds the proper time which is commonly known as the infusion time.

In conventional practice, it usually happens that the water is considerably below its boiling temperature, or it may not be fresh. These shortcomings are in themselves attributable to many variable factors depending either on apparatus or operating personnel habits. Most equipment often fails to heat the water fast enough to maintain boiling, especially during periods of active consumer demand requiring rapid brewing. Conversely, during periods of little demand, the water is frequently kept boiling for long periods of time which renders it flat by removal of its natural dissolved oxygen. Furthermore losses and variations in temperature are the common occurrence in the usual practice wherein an operator employs a measuring cup or bucket to transport the heated water from a boiling vat to the coffee grounds. For example, much heat energy may be lost to the surroundings, as to the air in the process of permitting the water to drop from a faucet through the air into the bucket, or by permitting it to fall into a relatively cold bucket of large heat capacity, or because of the time element involved in transporting. Under these typical conditions, it is to be observed that even though the water may be boiling in the boiling vat just before it is removed, the foregoing factors may sometimes give rise to a heat loss amounting to as much as 30° F. before the water is finally applied to the grounds.

An important second factor is the manner in which the water is applied to the grounds. The generally accepted method of making good coffee and the method generally recommended by coffee manufacturers is the "drip method." In this method, water is permitted to "drip" or seep drop-by-drop through the body of coffee grounds into a suitable container. This, of course, is as opposed to another common practice of permitting the grounds to soak in a considerable body of water, or the practice known as "percolation" in which the partially brewed coffee is repeatedly pumped through the grounds until completely brewed.

It will be found that the ideal infusion time and other conditions are seldom attained in practice. It frequently happens that an operator will apply the entire content of the measuring cup, which is usually about one gallon, to the coffee grounds at once with the result that considerable pressure is applied to the grounds and that pressure forces the water through the grounds faster than is proper, which improperly lessens the infusion time.

The foregoing factors are particularly vulnerable to the common human faults of unskilled personnel. Conventional practices afford considerable opportunity for errors of unskillfulness or forgetfulness either as to the amount of water applied, as to its temperature, or many other factors. This all gives rise to the common experience that the coffee is either too strong or too weak and it is the rare case when it is just right. This means not only dissatisfaction on the part of the consumer but often also waste to the extent that an efficient maximum amount of finished coffee is not obtained from a given quantity of grounds.

Still another very important requirement in the brewing of consistently good coffee is the removal of the coffee grounds from the apparatus immediately after the water finishes passing through the grounds. If they be allowed to remain in the apparatus for any length of time after the water has dripped through, they are apt to be steamed by the hot finished coffee below. This steaming causes certain undesirable oils to be extracted from the used grounds which creates a bitter or otherwise undesirable taste.

By the present invention there have been provided means and methods to obviate many of the foregoing difficulties. The personnel factor has been eliminated almost completely and otherwise there have been provided means optionally operable in either manual or automatic fashion which will insure the proper conditions of freshness, temperature, infusion time, quantity of water, etc.

Some of the salient features of the invention which function either individually or in various combinations of each other to constitute an apparatus meeting the above indicated objectives with maximum efficiency and convenience, particularly for hotel or restaurant operations, may be summarized somewhat as follows:

1. Means are provided which render it impossible to apply to the grounds anything other than the exact required amount of water and by the ideal "drip" conditions; and impossible to apply it at other than a temperature substantially that of the boiling temperature. At the same time, the possibility of rendering the water flat by boiling it for substantial periods of time prior to the application to the grounds is precluded.

2. To facilitate proper supervision, signal means, such as indicator lights, are provided in such manner that supervising personnel may be informed as to just when each phase of the brewing cycle is taking place.

3. Means are provided whereby the apparatus may be converted to manual as opposed to automatic operation if the necessity arises and without sacrifice of the characteristics of consistency and uniformity of the brewing process.

4. A feature permitting the selection of predetermined quantities permits the making of small quantities during periods of relative inactive demand and large quantities during periods of considerable activity thereby minimizing the possibility that the finished coffee may stand for considerable periods of time before use. Fresh coffee may thus be made always available.

5. There are a minimum number of moving parts; for example, such conventional elements as float valves are eliminated. Possibilities of disablement of the apparatus are thereby minimized and, if repairs become necessary, they are generally very simple and inexpensive.

6. Numerous safety features are included, for examples, features which automatically prevent the application of heat to the boiler if for any reason the system fails to supply water thereto, or, in the case of gas operation, features which prevent the application of heating gas should the pilot light be extinguished.

The illustrative apparatus

Figure 1:
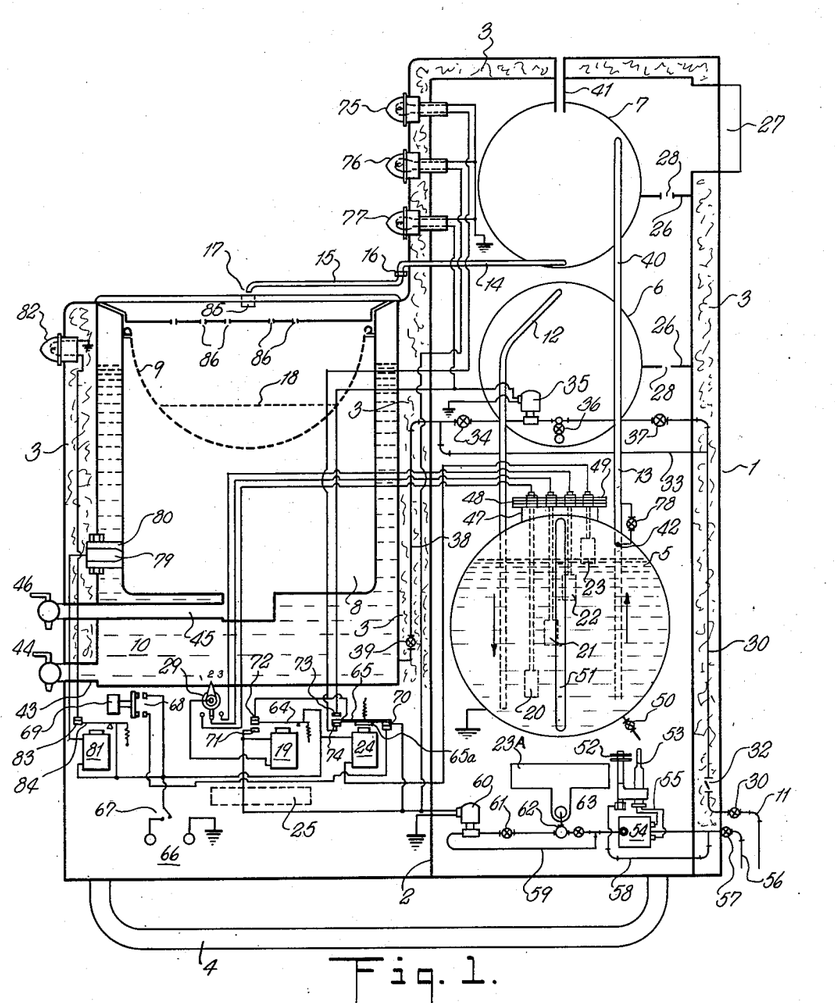
Figure 2:
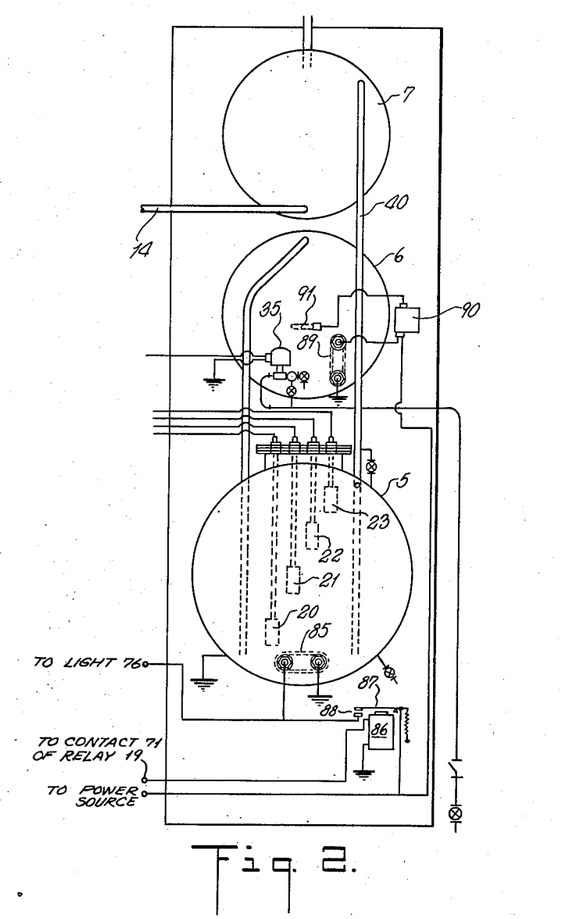

Referring now to the Fig. 1 which illustrates, in somewhat schematic form and in cross section along a vertical plane, one embodiment of the invention operable by common illuminating gas, the apparatus may be incorporated in any suitable housing or cabinet 1 which may be divided into two compartments by a central wall 2 and provided with heat insulation linings 3 as shown. It should be considered that the cabinet 1 will normally be positioned to rest, as on a pair of U-shaped legs 4 (one of which is concealed behind that shown), such that the cylindrical tanks 5, 6 and 7, presently to be discussed, will be in a generally vertical array. Among the principal operating elements of the apparatus are the water pre-heating tank 6, which is optional, the main boiler 5 for boiling a quantity of water prior to application to the grounds, the receiver tank 7 in which the boiling water is stored temporarily just prior to application to the grounds, and a vessel or urn 8 in which the finished coffee collects and which is provided with the removable container 9 such as a cloth bag of conventional type for holding the coffee grounds through which the water is to drip. Vessel 8 may be surrounded by a hot water jacket 10 for keeping the finished coffee hot.

Under the control of the elements to be discussed later, water from a supply main 11 may be delivered in timed relation to the preheating tank 6 from which it flows by gravity through the tube 12 into the main boiler 5. After the water in main boiler 5 is brought to the boiling temperature it will be delivered in a well known manner by pressure in its upper part through the tube 13 into the receiver tank 7 whereupon it flows at a regulatable rate through the tubes 14 and 15, swivel connected at 16, to drip slowly from the orifice or spout 17 at the end of 15 into the body of coffee grounds 18. This whole process is caused to take place in timed relation and in a cyclic automatic or semi-automatic manner by the control means now to be described.

The control means will provide for the filling of the preheater tank 6 and the boiler tank 5 after which further influx of water into the preheater tank 6 will be prevented until a predetermined charge of the accumulated water in the heater tank 5 has been heated and passed on to the receiver tank 7 and thence into the body of the coffee grounds, thereby insuring that a definite predetermined quantity of water will be supplied to the grounds, no more, no less. After the water has been boiled out of the tank 5 in this manner and after it has been discharged completely upon the grounds then the control apparatus will automatically permit a renewed influx of water into the tank 6 to refill the tank 5 in preparation for a repetition of the cycle at the will of the operator, or automatically if so desired.

The control means includes the following: First, means such as the relay 19 in conjunction with the series of probes 20, 21 and 22 positioned to protrude into the body of water in the tank 5, for energizing the gas burner heater 23A for the heater tank 5 when the body of boiling water therein is above a predetermined level corresponding to a selected one of probes 20, 21 and 22 and automatically deenergizing the heater 23A when the water has dropped below that level by virtue of the water's passage by boiling action into receiver tank 7 during the boiling operation. Thus, assuming that the tank 5 is full (level of probe 23) at the beginning of the cycle, a definitely predetermined quantity of water down to the level of whichever of the probes 20, 21, or 22 is selected, will be supplied to the coffee grounds. Secondly, means including, for example, the relay 24 and the probe 23, which is similar to the probes 20, 21 and 22, are provided to control an automatic refilling of the boiler tank 5 and the preheater tank 6 after the water level in the tank 5 has dropped to a level at which the heater 23A is automatically disconnected by the means including the relay 19 just discussed. This refill control means includes means functioning through the probe 23 and the relay 24 to discontinue the supply of water to the preheater tank 6 when the water level in the tank 5 has risen again to the level of probe 23. The process of refill is suitably time-delayed such that the refilling of the tank 5 will not occur at a rate sufficiently large to permit the incoming water to interfere with the charge of water from the preceding boiling cycle.

It should also be pointed out that the generally vertical arrangement of the three tanks 5, 6 and 7 permits both the preheater tank 6 and the receiver tank 7 to be preheated by convection currents flowing upward from the burner 23 around the tank 5 into the vicinity of the tanks 6 and 7. Convection currents from a gas burner heater 25 under jacket 10 add to the effect. The baffles 26 extending along the length of tanks 6 and 7 prevent inefficient escape of the convection currents directly to the flue 27 and force them to flow leftward so as to come into more efficient thermal contact with the lower and left sides of tanks 6 and 7. Baffles 26 may have holes 28 to permit some of the convection to flow directly upward to flue 27. This whole arrangement has the advantageous result that the water may be preheated in tank 6 before it enters the tank 5, thereby increasing the efficiency of the machine and the speed at which the boiling cycle may be repeated. At the same time, the convection currents tend to add heat to the water in the receiver tank 7 and thereby tend to maintain it at the maximum possible temperature which, of course, is one of the principal objectives of the apparatus.

It will already be apparent that the apparatus provides a way of insuring that a definite and uniform quantity of water will always be delivered to the grounds and that the operator will have no opportunity to make an error in that quantity either by neglect or by forgetfulness. At the same time it will be apparent that the water may be maintained almost at its boiling temperature up until the very moment when it is dripped upon the grounds. Furthermore, by the selection of the appropriate probe 20, 21 or 22 through the selector switch 29 the net quantity of water boiled or coffee prepared may be readily controlled to meet the needs of periods of relative inactive demand or extremely active demand thereby minimizing the necessity of maintaining large bodies of prepared coffee at any one time.

Having now outlined some of the more essential elements of the system, the further details thereof and the more precise manner of functioning thereof will now be described.

First, for the water supply system—water may be supplied from any convenient source such as a city water main 11 to the inlet line 30 through the manually controlled valve 31 and the strainer 32 which removes particles of sediment which may impair operation. During the normal automatic operation of the machine the water will follow the course of the line 30 and the line 33 to the manually controllable shut-off valve 34 and, from there, through a magnetically actuatable valve 35 and the three-way valve 36 into the preheater tank 6 whenever the magnetic valve 35 is open in accordance with the operation to be described. While valve 35 is said to be "magnetic," it will be understood that it may be of any conventional type which may be opened or closed under the control of relay 24 as hereinafter described. When, as in emergency situations, it is desired to supply water to the preheater tank 6 manually, the valve 34 may be closed, the manually operable valve 37 opened and water thereby supplied to the valve 36 and the tank 6. The line 38 and the manually operable valve 39 may be provided for the purpose of supplying water to the heating bath in jacket 10 surrounding the coffee urn 8 for the purpose of keeping the finished coffee hot.

The pipe 12 interconnecting the top of the preheater tank 6 and the bottom of the boiler tank 5 provides for the flow of water from the top of the tank 6 to the bottom of the tank 5 under the pressure head of the supply main 11. Tank 6 is normally always filled with water and valve 36 open. This water may be transferred to tank 5 through pipe 12 only by opening of valve 35 or valve 37 respectively in accordance with the automatic or manual operation to be described. Pipe 40 interconnecting the bottom of the tank 5 and the top of the receiver tank 7 provides for the flow of water from the former to the latter when pressure of boiling in the top of the tank 5 drives the main body of water therein downward in the well known manner. It will be noted that the receiver tank 7 is vented to atmosphere through the vent tube 41 and that this vent tube 41 also vents the tank 5 and the tank 6, tank 5 being vented through the orifice 42 in tube 40 and tank 6 vented through the tube 12, tank 5 and tube 40. Safety valves, therefore, become unnecessary.

The tank 7 is provided with the outlet tube 14 close to the bottom thereof and that outlet tube is provided with the swivel joint 16 to which the rotatable tube 15 is attached in such manner that it may be positioned to deliver water to the coffee grounds and yet may be rotated out of the way when it is desired to remove the container 9 of the coffee grounds. The spout 17 in the end of the the tube 15 is provided with a restriction such that the rate of flow from the tank 7 through the tube 14, joint 16 and tube 15, can be set at any desired rate. Preferably the restriction will be adjusted so that the water drips through the coffee grounds at a rate which will insure the proper infusion time.

A tank 43 constituting the jacket 10 is provided to hold hot water so that the finished beverage in the urn 8 containing the finished coffee can be kept hot until serving and may have a suitable outlet faucet 44. The water in the tank 43 may be heated by any suitable means illustrated by the gas burner 25 or by electrical heater means where electricity is used as a source of heat.

The finished beverage may be drawn from the urn 8 through any suitable conventional means illustrated by the tube 45 and the faucet 46.

The probes 20 to 23 are suspended by suitable metal rods through an opening 47 in the tank 5 in such manner that they extend to various levels in the body of water therein substantially as indicated. The probe 23 will be positioned at the maximum desired level of water while the probes 20, 21 and 22 will be spaced progressively downward by distances corresponding to the amount of water to be handled for any particular coffee brewing operation. It will be understood that any number of probes may be used; four have been selected only for the purposes of illustration. These probes are of any suitable material, for example, stainless steel, and may be suspended by any suitable means, such as by extension through the insulator 48 of ceramics or porcelain which supports and insulates the probe rods from the cover plate 49 which is attached to the tank opening 47 by means of screws, clamps or other practical means. A gasket may be used between the tank opening flange and the cover plate to make it tight.

If desired, the tank 5 may be provided with the drain valve 50 used to drain it if need be, and with any suitable level indicator 51 in the nature of a glass tube, for example.

Gas burner 23 is suitably placed beneath tank 5. A pilot light 52 and a thermocouple 53 responsive to the pilot light are placed near the burner. The thermocouple 53 is connected to a thermovalve 54 through the wires 55 to control the opening and closing thereof depending upon whether the pilot is burning or extinguished. All of these units are of conventional construction, and, thus, further detail is not given. They may be supplied by a gas line 56, for example, from city mains (not shown) or from storage tanks or mains with bottled gas which supply the gas through the manually operable valve 57 to the thermovalve 54. The valve 57 is manually operable for disconnecting the gas supply when desired. A pipe 58 is provided to supply the pilot light 9 with gas.

During the normal automatic operation to be described, gas will flow through the thermovalve 54 through the line 59 to the magnetically operable valve 60 and thence through the normally opened, manually operable valve 61 to the three-way valve 62 from which it is delivered to the gas burner 23. During manual operation in the event of emergency, the valve 61 is manually closed and the valve 63 opened so that the gas may flow through that valve to the gas burner.

The relays 19 and 24 of the control circuits are conventional type, electromagnetically operated solenoids having the armatures 64 and 65 each biased such that when the relays are deenergized their armatures move upward, for example, under the force of the tension springs indicated schematically. Armature 64 is metallic so that it may constitute a conductive part of the circuit as indicated; armature 65 is of insulating material with a magnetic disc 65a thereon for cooperation with the magnetic field of relay 24.

The relays may be energized as follows: Relay 19 may be connected to the power source indicated schematically as 66 through the switch 67, which is a simple manually operable "on" or "off" power switch for disconnecting the entire system, and the switch 68, which is of a momentarily closable type, i. e., adapted to be manually closed by pressure on its push button 69 but which will spring open when the pressure is relieved. The remainder of the circuit for the coil of relay 19 includes one of the probes 20, 21 or 22 connected through the selector switch 29 to the coil of relay 19, and the contacts 70 which are drawn together when the armature 65 is drawn down by energization of relay 24. The coil of relay 24 is similarly energized except that its circuit includes only the switch 67, not 68; and the other end of the coil is connected to the probe 23, as indicated. The circuit of both relays may be completed through water in tank 5 to the tank itself which is grounded as shown— but only when the water level is high enough to contact the respective probes.

It will be observed that the relay 19 is so arranged that when energized and its armature is drawn downwardly into contact with the lower of the two contacts 71 and 72, the circuit of the magnetic valve 60 will thereby be energized by power supply from source 66 through the armature of relay 19 for the purpose of opening the valve 60 to supply gas to the burner. At the same time the coil of relay 19 will be energized independently of switch 68 and contacts 70. It will further be noted that when both relays are in their upper positions, a circuit will be closed which energizes the coil of the magnetic valve 35 to permit the flow of water into the tank 6. This circuit is through the upper contact 73 and the armature of relay 24, contact 72 and the armature of relay 19 and thence to switch 67 and source 66.

The automatic operation of the apparatus just described is as follows. For convenience of illustration, assume the cycle starts with the tank 5 completely filled, i. e., to the level of probe 23 and tank 6 likewise filled. The urn 8 is empty. The container 9 is provided with a quantity of coffee grounds sufficient to accommodate the making of a quantity of coffee from an amount of water corresponding to that between the probe 23 and whichever of the remaining three probes are selected on the selector switch 29, for example, the probe 21, as indicated.

The switch 67 is first manually closed to set the machine in condition for operation. At this stage a white light 75 will be energized to indicate to the operator that the boiling operation is not in process yet and this occurs because relay 24 has been energized (the water completes its circuit) and relay 19 is deenergized thereby connecting the lamp to the power source through contacts 72 and 74, and the armature of relay 19, through the circuits indicated. At the same time the gas pilot light 52 is burning and its heat operating on thermocouple 53 to open the thermovalve 54 so that gas is delivered to the magnetic valve 60 which is still closed. The tank 5 is filled with water which is relatively cold, or at least preheated by any preheating which it may have received in the tank 6 during a preceding brewing cycle. Both of the magnetic valves 60 and 35 are in their normally deenergized states at this point, the latter therefore having shut off any further influx of water to tanks 6 and 5.

To begin the heating operation and thereby the entire automatic brewing cycle, the operator momentarily pushes the button 69 of the switch 68 thereby momentarily to energize relay 19 through the contacts 70, the selector switch 29, the probe 21, the water in the tank 5 and the tank itself to ground. Thereby the armature of relay 19 is pulled down to deenergize the white light 75 by breaking contact with the upper contact 72 and energizing the coil of magnetic valve 60 by making contact with the lower contact 71, at the same time continuing the energization of relay 19 through contact 71, selector switch 29, probe 21 and the water in tank 5 to ground. The gas burner 23 is thereby supplied with gas which is ignited by the pilot light 52 and the heating begins. Even though the switch 68 is only of a momentary contact type and has been again opened when the operator releases the button 69, the magnetic gas valve 60 will remain energized because the initial closure of the circuit of relay 19 has established a new energizing circuit for the coil of relay 19 through its own armature and the lower contact 71. While the white light 75 has gone out to indicate the beginning of the heating operation, the red light 76 connected in parallel with the coil of the magnetic gas valve 60 has now been lit to indicate that the heating operation is in process.

As already indicated, when the boiling water reaches the tank 7 it is kept near the boiling point by convection of the flue gases. Preferably the tank 7 is of sufficient size that it may receive water from the tube 40 at a rate greater than the rate of out-flow through the tubes 14 and 15. Therefore, regardless of how fast the water leaves the tank 5 and goes to the tank 7, the rate of flow from spout 17 is held at the proper rate of flow so as not to fill up the coffee bag of container 19 faster than the water drips through the coffee grounds and the proper infusion time of hot water and grounds remains satisfactory throughout the whole dripping period.

Relay 19 and consequently magnetic valve 60 will be deenergized when the water level in tank 5 boils down below the level of probe 21 thus breaking the circuit of relay 19 and discontinuing the heating.

Now, as to the automatic functioning to refill the tank 5 in time-delayed relation to the boiling up process just described—as the water level in the tank 5 is depressed by the pressure generated by boiling, there will first come a point at which the probe 23 becomes uncovered. This breaks the circuit through the water and the grounded tank 5 with one side of the coil of relay 24 as a consequence of which the relay 24 becomes deenergized and its armature moves upward under the force of its spring bias to break contact with the lower contact 74 and to make contact with the upper contact 73. However, no further action takes place until the water is further depressed to a level at which the probe 21 is uncovered because relay 19 is still energized and its armature is not in contact with the upper contact 72. When, however, the probe 21 is uncovered by further lowering of the water, the circuit of the coil of relay 19 is broken because there is no conducting path through the water between the probe 21 and the grounded metal casing of tank 5. When the two relays 19 and 24 are deenergized at this stage in this manner, the circuit of the coil of magnetic valve 35 is closed at contacts 72 and 73 so that the power source 66 may energize the valve 35 to open the same and permit water to flow into the preheater tank 6. Because, however, of suitable restrictions in the inlet pipe leading into the tank 6, the refilling water will flow in at a relatively slow rate to insure that no fresh water enters the boiler tank 5 until the preceding boiling stage of the brewing cycle is completed. Further, at this stage, when the relays 19 and 24 have both been deenergized the circuit of the red light 76 has been broken and the circuit of a green light 77 has been closed to light the same, thus indicating to the operator that the boiling portion of the cycle has been completed and that a refill step is in process. Light 77 is in parallel with the coil of magnetic valve 35 and thus energized by the same circuit.

As the preheater tank 6 is automatically refilled it will in turn refill the boiler tank 5 to raise the level of the water to the probe 23 whereupon the relay 24 is again energized to discontinue the refilling process by opening the circuit of the coil of magnetic valve 35; but inasmuch as the relay 19 is deenergized the heating portion of the cycle does not again commence until the operator again presses the button 69 to restart the cycle. It will be apparent, of course, that the water level in the tank 5 can never go beyond the lower surface of the probe 23 since, when it reaches that point, the magnetic valve 35 is automatically closed to cease further filling. Similarly, the water level in the tank 5 can never get much below the level of the probe 21 because, at that point, the boiling action is discontinued. This, as will be apparent, insures that a definite and predetermined amount of water corresponding to that between the levels of the probes 21 and 23 will always be supplied to the coffee grounds. That predetermined amount, of course, may be varied at the will of the operator by choosing either the probe 20 or the probe 22 in the place of probe 21 depending upon how much coffee he wishes to make and how much in the way of grounds he has placed in the container 9. Switch 29 permits the selection of probes; its indicated positions "1", "2" and "3" correspond to a selection of probes 20, 21 and 22 for connection to the coil of relay 19.

To illustrate, let us assume that the volume of water between the probes 21 and 23 is one-half gallon by volume with the selector switch set on position number "2." Then only one-half gallon of water can leave the tank 5 because when probe 21 is uncovered and closes the magnetic valve 60 which in turn shuts off the gas supply to the burner 23, simultaneously the magnetic valve 35 opens and this one-half gallon of water is replaced in tank 5 as the magnetic valve 35 closes the moment the water level in tank 5 again makes contact with the probe 23. Water replaced in tank 5 is at a lower temperature than the water remaining in tank 5 and, therefore, a slight vacuum is formed in tank 5. The pressure, therefore, ceases and water stops leaving tank 5 through tube 40. Of course, there is a slight time element that enters into this picture, however, when the distance between the probe 23 and the other probes are properly adjusted, the exact desired amount of water can be measured by volume taking into consideration factors such as the time element required, the expansion of water when heated, etc.

One factor entering into the operation of the relays may need attention. Should the water in the tank 5 boil too violently and cause ripples or waves in the surface, it is possible that whatever probe is connected through the selector switch 29 could be uncovered momentarily and electrical contact broken when the low point of this wave or ripple uncovers it. The relay 19 will not reset itself when the water recontacts this probe. However, this problem may be resolved simply by employing relays with some time-delay action such that they will not cut in and out with momentary interruption as just described. Those skilled in the art will readily understand how to contrive such a relay.

It has already been mentioned that it is rather essential to the making of good coffee that the grounds be removed immediately after all of the water has flowed through them—this in order to prevent any accumulation of embittering oils which might impair the taste of the coffee. To cause the operator to be warned that removal is necessary at the proper time the lights 75, 76 and 77 operate in timed relation with the control circuit to warn the operator when all of the water has flowed through the coffee grounds. The functioning to this end is as follows. Either the pipes providing for influx into tank 6 or the valve 36 may be adjusted to restrict the flow of cold water from the magnetic valve 35 into the preheating tank 6 in the manner already mentioned. For example, the valve 36 may be so adjusted that, if it takes a given period of time, for example five minutes, for the water to drip through the grounds in container 9, it will take the same amount of time, five minutes, for the required amount of refilling water to flow from the preheating tank 6 into the boiler tank 5 and bring the level thereof back to that of the probe 23. As long as the valve 35 is open, the green light 77 will stay on and the other lights are out. When the level of the water in the tank 5 reaches the probe 23 again the relay 24 will again be energized whereby the green light 77 will go out and the white light 75 will go on. This will notify the operator that all of the water has flown through the coffee grounds and that he should immediately remove the coffee bag from the machine. He will also know that the entire unit is in a position to restart the cycle.

Consideration must also be given to the fact that when the water has been taken out of the tank 5 and driven into the tank 7 and replaced from the tank 6, the air above the level of the water in the tank 5 must be released in some manner in order not to build up pressure which would tend to force the remaining water in the tank 5, which has now cooled, up through the tube 40. To this end I have provided the relief hole 42 in the tube 40 at the highest point possible on the inside of the tank 5 and above the contact point where the probe 23 will be contacted by the water level. When this hole is of proper size it will allow the air above the water level in the tank 5 to escape through the tube 40 and into the tank 7 which is vented to atmosphere at 41, thereby allowing the tank 5 to refill without building up any pressure. At the same time it will be small enough that it will not interfere with the normal boiling operation driving the water into the tank 7. The amount of steam during the latter operation which escapes through the vent hole 42 will be negligible and not sufficient to prevent enough pressure from forming in the tank 5 to force the hot water up to the tank 7.

This vent hole 42 has another advantage. When the heating of the water in tank 5 begins it will expand before it begins to be driven upward. The resultant increase in air pressure in the upper part of tank 5 will then be relieved by the vent hole 42 so that the only partially heated water will not be driven partially upward in the tube 40.

The size of the vent hole 42 for these purposes may readily be determined by experiment; at any rate it will be readily understood by those skilled in the art how best to choose the size so that it functions as desired. Considering the possibility that this vent hole 42 may become clogged by salt and encrustations formed from the boiling of the water, there have been provided an auxiliary manually operable vent valve 78 which will perform the same function in emergency. It is normally closed but when opened interconnects the upper portion of the tank 5 with some point on the tube 40. When opened it will thus perform the function of vent 42 until the latter can be repaired.

It is known that the conventional type of level indicators comprising a glass tube having ends connected at various levels of the urn 8 together with the end valves necessary to their cleaning, are unsatisfactory because they are inclined to accumulate dirt or coffee deposits which may turn the prepared brew rancid. In order to avoid such shortcomings in the present apparatus, there have been provided instead the means for warning the operator when the level of coffee in the urn 8 has reached a level approaching depletion centering around the contact 79 in the wall of the urn 8. This is so set into the wall of the urn that it will make contact with the liquid therein and, of course, is insulated from the urn by the insulating block 80. It may be positioned at any desirable level and is preferably devoid of sharp corners or projections around which dirt or rancid coffee might accumulate. The contact 79 is connected through the solenoid 81 to the power source. The amber warning light 82 may be connected by closure of the contacts 83 operating with the armature 84 to the power source. It will be readily apparent that when the coffee urn has a sufficient quantity above the level of the contact 79 the light will be out because the solenoid is energized by completion of its circuit through the coffee to the grounded urn 8. Should, however, the level drop below the contact 79, the solenoid will be deenergized, its armature which is upwardly spring-biased will open the light circuit at the contacts 83 and the warning amber light will be lighted to call the operator's attention to the fact. Refilling, of course, will cause the converse action; the light will go out.

Several advantageous safety features will be readily apparent from the foregoing. Among these the following may be mentioned:

First, should for any reason, such as a leak, the level of the water in tank 5 have fallen before the operator wishes to begin a brewing cycle, the level will automatically be brought back to that of the probe 23. Furthermore, the operator cannot start the cycle unless the tank 5 is full because the gas magnetic valve 68 must necessarily remain closed until that level has been initially established, even though the button 69 be depressed. This follows from the fact that, if probe 23 is uncovered, the relay 24 must necessarily be open and the circuit of relay 19 must necessarily remain open at contact 70. Under these circumstances the magnetic valve 35 is opened to permit the influx of refilling water and the operator cannot apply heat to boiler 5 until a full level has been initially established.

Further, the gas burner 23 cannot be turned on if the pilot light 52 should go out for any reason since the thermovalve 54 will automatically close should the pilot light go out and it cannot be opened until the pilot valve is relighted.

As already mentioned, either the gas inlet or the water inlet system may be operated manually if for any reason the controls, either as to the gas or the water influx, get out of order. This is accomplished simply by closing either of the valves 61 or 34 manually and then by controlling the influx of either gas or water manually through the valves 37 or 63. The sight gage glass 51 on the tank 5 has indicia at levels so that the operator can accurately measure the water in and out of tank 5 in the same proportion that the selector switch 28 and probes 20 to 23 measure it when automatically operated.

The cover on the urn 8 is of any suitable metal and fits down on the urn bowl as shown. It is made hollow as shown with the opening 85 to receive the hot water from the spout 17. The lower wall of the cover is provided with a series of holes 86 of suitable size evenly to distribute the hot water over the coffee grounds in the container 9.

With the changes indicated by the Fig. 2 as an example the apparatus may also be made to function entirely by electricity. Since the main portions of the apparatus are identical, the changes made have been indicated only fragmentarily. Gas burner 23 and all associated valves, gas lines and like controls have been eliminated, also gas flue 27, and replaced by the following:

A direct immersion electric heater 85 of suitable capacity has been placed inside tank 5. A relay 86 of suitable capacity to handle the load of heater 85 is provided and the operation is essentially the same as gas operated Fig. 1, except that relay 86 turns the electric heater 85 off and on in the following manner.

When button 69 (Fig. 1) is depressed, the coil of relay 19 is energized pulling its armature 64 downward as before to make contact with the lower contact 71 thus permitting the current to flow to coil of relay 86 which brings its normally upwardly biased armature 87 downward to close contacts 88. Thus, immersion heater 85 and red light 76 are energized and the water in tank 5 is heated. When the water boils and a pressure forms in tank 5 the water leaves the tank 5 through tube 40 and from there on the operation is as described for Fig. 1. When the level of water uncovers whatever probe is selected by selector switch 29 and opens relay 19, then contacts 88 open as relay 86 becomes deenergized. Thus heater 85 is cut out and red light 76 goes out. Magnetic valve 35 opens and green light 77 goes on. Water is replaced in tank 5 and when up to level of contact with probe 23, valve 35 shuts off the water supply to tank 7. Green light 77 goes off and white light 75 goes on for the same reasons as given for gas operated unit (Fig. 1).

There has been added in the all electrical operated unit on the inside of pre-heating tank 6 an electrically operated heater unit 89 of the direct immersion type, a thermostat 90 and bulb 91 which can be set to cut out the heater element when the water in tank 6 reaches the predetermined desired temperature.

It is not good practice to permit the water in preheating tank to rise above 130° F. and 135° F. so as not to liberate its virgin oxygen and become flat but some preheating is desired so that when this water reaches tank 5 it can be boiled in a shorter time than would be the case if tap water were used without pre-heating. However, should it be desired to eliminate the pre-heating tank 6, the system will still function.

Low alternating current can be used throughout in the relays, magnetic valves and probes through the use of a transformer to deliver the voltage desired and with the use of low alternating current voltages in the probe circuit, the problem of electrolysis is thereby eliminated.

While but two embodiments of the invention have been shown and described it will be understood that numerous modifications may be made without departing from the true spirit and scope of the invention as set forth in the appended claims.

What is claimed is:

1. Apparatus for brewing by passage of liquid when heated through a body of brewing material for infusion therein comprising: means for positioning a container adapted to receive said liquid after passage through said material, a boiler in which said liquid may be heated preparatory to passage through said material, a heater for said boiler, means for delivering said liquid when heated from said boiler to said container, and control means for controlling the heating of said liquid in said boiler and the passage of a predetermined quantity of said liquid from said boiler to said container comprising, in combination, a first electrode in said boiler at a predetermined low level and a first relay in circuit therewith and with said boiler through said liquid when above said low level, connections between said first relay and said heater for energizing the latter when said first relay is energized and deenergizing said heater when said relay is deenergized, a second electrode in said boiler at a predetermined maximum level and a second relay in circuit therewith and said boiler through said liquid when at said maximum level, means for limiting the liquid in said boiler to said predetermined maximum level when said second relay is energized, means for energizing said relays through the indicated circuits when said liquid is at the respective levels including a control connection from said second to said first relay preventing initial energization of said first relay until said second relay has first been energized, whereby said heater may be energized initially only when said liquid is at said maximum level.

2. Apparatus as in claim 1 in which said first relay includes a circuit for maintaining energization thereof independently of said second relay after said second relay has been deenergized by lowering of said liquid below said maximum level, whereby said first relay and said heater may remain energized until the circuit of said first relay is opened by lowering of said liquid below said lower level.

3. Apparatus as in claim 2 including supply means for renewing a supply of said liquid to said boiler up to said maximum level, and connections between said relays and said supply means so arranged that said supply means supplies liquid to said boiler only when both said relays are deenergized.

4. Apparatus for brewing by passage of liquid when heated through a body of brewing material for infusion therein comprising: means for positioning a container adapted to receive said liquid after passage through said material, a boiler in which said liquid may be heated preparatory to passage through said material, a heater for said boiler, inlet means for supplying said liquid to said boiler, means for delivering said liquid when heated from said boiler to said container, and control means for controlling the influx of fluid to be heated through said inlet means to said boiler, the heating of said liquid therein and the passage of said liquid from said boiler to said container comprising, in combination a first electrode in said boiler at a predetermined low level and a first relay in circuit therewith and with said boiler through said liquid when above said low level, connections between said first relay and said heater for energizing the latter when said first relay is energized and deenergizing said heater when said first relay is deenergized, a second electrode in said boiler at a predetermined maximum level and a second relay in circuit therewith and with said boiler through said liquid when at said maximum level, means for selectively energizing said relays through the indicated circuits including a control connection from said second to said first relay preventing energization of said first relay until said second relay has first been energized whereby said heater may be energized initially only when said liquid is at said maximum level, and a circuit through said relays when deenergized for opening said inlet means to supply liquid to said boiler.

5. Apparatus as in claim 4 in which said first relay includes a circuit for maintaining energization thereof independently of said second relay after said second relay has been deenergized by lowering of said liquid below said maximum level, whereby said first relay and said heater may remain energized until the circuit of said first relay is opened by lowering of said liquid below said low level.

6. Apparatus as in claim 4 including signal means operative in conjunction with said first, second, third and fourth means for indicating, first, when said liquid is at said maximum level but said heater is deenergized, second, when said heater is energized, and, third, when said inlet means is causing influx of said liquid to said boiler.

7. Apparatus as in claim 4 in which said inlet means includes a preheater tank through which said liquid passes prior to supply to said boiler, and preheating means for said tank.

8. Apparatus as in claim 7 in which said heater comprises a flame type burner and said preheating means comprises means for arranging said preheater tank in vertical array above said boiler.

9. Apparatus for brewing by passage of a predetermined quantity of liquid when heated through a body of brewing material for infusion therein comprising: means for positioning a quantity of said material, means for positioning a container adapted to receive said liquid after passage through said quantity of material, a boiler in which said liquid may be heated preparatory to passage through said quantity of material, a liquid supply source connectable to said boiler for supplying said liquid thereto, a heater for said boiler, means for delivering said liquid when heated from said boiler to said container, and control means for controlling the heating of said liquid in said boiler and the occasional passage of a predetermined quantity of said liquid from said boiler to said container comprising, in combination, means for supplying electric power; first means for connecting said source to said boiler and disconnecting it when said boiler is filled to a predetermined maximum level including a first electrode in said boiler positioned at said maximum level and a first relay energizable by said electric power through a first circuit including said first electrode, said boiler and said liquid when in contact with said first electrode; second means which when initiated in operation maintains said heater energized so long as liquid is present between the said maximum level and a predetermined lower level and deenergizes it when the liquid level drops below said predetermined level including a second electrode in said boiler positioned at said lower level and a second relay energizable by said electric power through a second circuit including said second electrode, said boiler and said liquid when in contact with said second electrode; third means maintaining said first means inoperable to connect said source to said boiler while said second means is operative to energize said heater including means operated by energization of said second relay; and fourth means precluding initiation of the operation of said second means until said boiler is first filled to said maximum level including a circuit for initiating operation of said second means by energization of said second relay, the latter circuit being interrupted by deenergization of said first relay.

10. Apparatus as in claim 9 in which said liquid supply source includes a preheater tank positioned vertically above said boiler whereby liquid in said preheater tank is preheated by convection from said boiler.

11. Apparatus for brewing by passage of a predetermined quantity of liquid when heated through a body of brewing material for infusion therein comprising: means for positioning a quantity of said material, means for positioning a container adapted to receive said liquid after passage through said quantity of material, a substantially closed boiler in which said liquid may be heated preparatory to passage through said quantity of material, a liquid supply source connectable to said boiler for supplying said liquid thereto, a heater for said boiler, means for delivering said liquid when heated from said boiler to said container by pressure generated by boiling in said boiler, and control means for controlling when initiated by an operator the successive operations of filling of said boiler from said source, the heating of said liquid in said boiler, and the passage of a predetermined quantity of said liquid from said boiler to said container, said control means comprising in combination means for supplying electric power; first means for connecting said source to said boiler and disconnecting it when said boiler is filled to a predetermined maximum level including a first electrode in said boiler positioned at said maximum level and a first relay energizable by said electric power through a manually closable first circuit including said first electrode, said boiler and said liquid when in contact with said first electrode; second means which when initiated in operation maintains said heater energized so long as liquid is present between the said maximum level and a predetermined lower level and deenergizes it when the liquid level drops below said predetermined level including a second electrode in said boiler positioned at said lower level and a second relay energizable by said electric power through a second circuit including said second electrode, said boiler and said liquid when in contact with said second electrode after said second relay has initially been energized; third means maintaining said first means inoperable to connect said source to said boiler while said second means is operative to energize said heater including means operated by energization of said second relay; and fourth means precluding initiation of the operation of said second means until said boiler is first filled to said maximum level including a manually closeable circuit for initiating operation of said second means by initial energization of said second relay, the latter circuit being interrupted by deenergization of said first relay.

12. Apparatus as in claim 11 in which said liquid supply source includes a preheater tank positioned vertically above said boiler whereby liquid in said preheater tank is preheated by convection from said boiler.

13. Apparatus as in claim 12 in which said means for delivering said liquid from said boiler to said container includes a receiver tank positioned vertically above said boiler whereby liquid in said receiver tank is heated by convection from said boiler.

EDWIN S. CLEMENS.

References Cited in the file of this patent

UNITED STATES PATENTS

| Number | Name | Date |
|---|---|---|
| 1,173,709 | Clausen | Feb. 29, 1916 |
| 1,346,898 | Kingsbury | July 20, 1920 |
| 1,385,593 | Strohbach | July 26, 1921 |
| 1,646,746 | Carroll | Oct. 25, 1927 |
| 1,820,981 | Lefever | Sept. 1, 1931 |
| 1,822,433 | Brand | Sept. 8, 1931 |
| 2,206,424 | Oyen | July 2, 1940 |
| 2,210,126 | Risien et al. | Aug. 6, 1940 |
| 2,394,885 | Baak | Feb. 12, 1946 |
| 2,427,444 | Colombo | Sept. 16, 1947 |
| 2,463,431 | Ruppe | Mar. 1, 1949 |
| 2,488,817 | Kaminky | Nov. 22, 1949 |
| 2,544,836 | Hotvedt | Mar. 13, 1951 |
| 2,568,840 | Zees | Sept. 25, 1951 |

OTHER REFERENCES

Scientific American, December 1944, page 261.